FIGURE 8 MEMORY CORE

Filed Oct. 11, 1967

INVENTOR
JACK L. METZ

BY R. C. Terry

ATTORNEY

United States Patent Office 3,521,256
Patented July 21, 1970

3,521,256

FIGURE 8 MEMORY CORE

Jack L. Metz, Des Plaines, Ill., assignor to Teletype Corporation, Skokie, Ill., a corporation of Delaware Filed Oct. 11, 1967, Ser. No. 674,620
Int. Cl. G11c *11/06, 5/02*
U.S. Cl. 340—174 10 Claims

ABSTRACT OF THE DISCLOSURE

An 8-shaped memory core cell including a glass substrate, a conductive layer covering one side of the substrate, a square wave shaped length of magnetic material mounted on the conductive layer, a compound strip comprised of a layer of insulation, a layer of conductive, nonmagnetic material and another layer of insulation extending along the square wave shaped length of magnetic material and covering the upwardly extending legs thereof and a straight length of magnetic material extending along the longitudinal center of the square wave shaped length of magnetic material and magnetically connected to the downwardly extending legs thereof.

BACKGROUND OF THE INVENTION

Magnetic core information storage devices are typically comprised of many loops of magnetic material mounted in a matrix array. Energization leads extend through horizontal rows and vertical columns of loops in the array so that if a current having a magnitude less than that required to cause the loops to change their magnetic state is passed through selected vertical and horizontal energization leads a selected loop can be energized and, depending on its previous magnetic state, caused to change its magnetic state due to the combined effect of the two currents. A sense lead passing through all of the loops detects the state of the selected loop by sensing the current pulse generated by a change in the magnetic state of the loop.

Information storage devices of this type have many inherent disadvantages. First, they are difficult and expensive to manufacture because energization and sense leads must be wired through all of the loops, often by hand. Second, a large amount of switching is required in order to place energization currents and the proper vertical and horizontal energization leads at the proper time. Third, since the energization currents are passed through many loops in addition to the selected loop, "disturb" voltages are often generated in nonselected loops.

SUMMARY OF THE INVENTION

In the preferred embodiment an information storage device is comprised of a plurality of figure-eight shaped memory units rather than simple loops. Such memory units may be automatically manufactured by depositing a first layer of magnetic material on a substrate, covering a portion of the first layer with a nonmagnetic, conductive sense lead layer and then extending a second layer of magnetic material between the ends of the first layer and over the sense lead to form an 8-shaped memory unit the legs of which are magnetically insulated from each other by the sense lead.

Figure 8 memory cores may be energized to one magnetic state by passing a current through one of their loops and may be switched to the other magnetic state by passing a current through the other loop in the same direction. Thus, they are well suited for energization by an electron beam which passes current in only one direction but which may be readily directed through one or the other of the loops of a memory unit. The use of an electron beam for core energization eliminates the necessity of energization leads which in turn eliminates the problem of "disturb" voltages and lead switching. Since the sense lead forms an integral part of the manufacture of the memory unit, all wiring is thus eliminated and the cost of the information storage device is greatly reduced.

DESCRIPTION OF THE DRAWING

A more complete understanding of the invention may be had by referring to the following detailed description when taken in conjunction with the drawing wherein.

DETAILED DESCRIPTION

Figure 2:
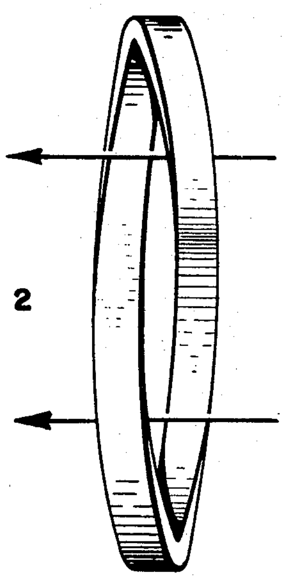
FIG. 2 is a top view of a figure-eight shaped magnetic core cell.
Figure 3:
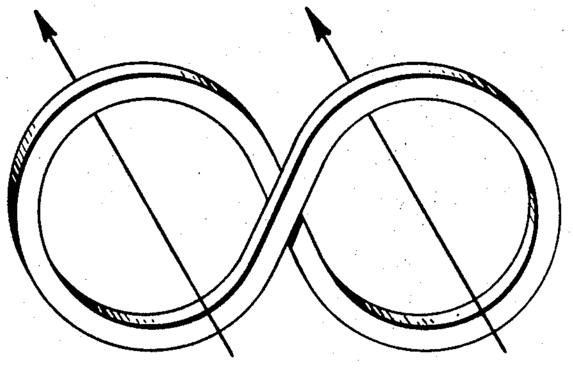
FIG. 3 is a front perspective view of the device shown in FIG. 2.

Referring now to the drawing, wherein like reference numerals designate like parts throughout the several views, with particular reference being had to FIGS. 2 and 3 there is shown a figure-eight memory core formed from a magnetic material having a high retentivity such as ferrite or the like. The term "figure-eight" is used herein to designate a memory core having two loops and having interconnecting legs which cross each other and which are magnetically insulated from each other at the crossing point. Figure-eight memory cores are different from ordinary cores in that a current passing through one of the loops of the core in one direction, for example, in the direction of the left-hand arrow in FIG. 3, causes the core to be magnetized to one state whereas a current passing through the other loop in the *same* direction, for example, the direction of the right-hand arrow in FIG. 3, causes the core to be magnetized to the opposite state. This characteristic is particularly beneficial when such figure-eight memory cores are energized by electron beams since the core may be made to change states by merely directing the electron beam through the appropriate one of the loops.

Figure 1:
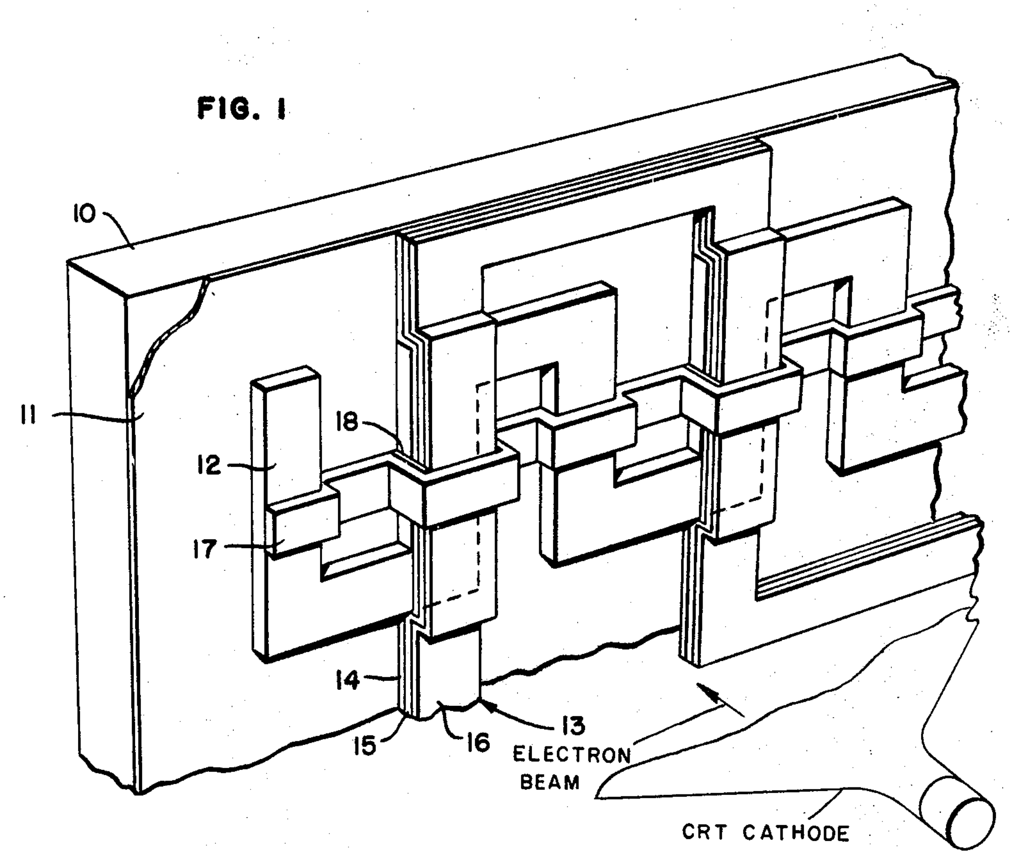
FIG. 1 is a perspective view of an information storage device made in accordance with the preferred embodiment of the invention.

Referring now to FIG. 1 there is shown a figure-eight memory adapted for manufacture by printed circuit manufacturing techniques and adapted for actuation by an electron beam. The core is supported on a glass substrate 10 upon which a conductive layer 11 is deposited. A square wave shaped length of magnetic material 12 is formed on the conductive layer 11 and is comprised of a high retentivity material such as cobalt 65 or an alloy of 60% nickel and 40% iron. The square wave shaped layer 12 extends along the conductive layer 11 through several square wave cycles. Mounted over the square wave shaped layer 12 is a compound layer 13 comprised of a layer of insulation 14, a layer of a conductive, nonmagnetic material 15 such as copper and a second layer of insulation 16. The compound layer 13 also is a square wave shaped configuration; however, the square wave configuration of the layer 13 has a greater "amplitude" than does the layer 12 and has a "period" double that of the layer 12 so that the compound layer 13 covers the layer 12 at each "upwardly" extending leg thereof. Extending along the longitudinal center of the square wave shaped layer 12 is a second, straight layer of high retentivity magnetic material 17 which is welded or otherwise magnetically connected to the square wave shaped layer 12 at each "downwardly" extending leg thereof, that is, each leg not covered by the compound layer 13. The straight layer 17 is insulated from the conductive layer 15 of the compound layer 13 by small sections of insulation 18.

The conductive layer 15 of the compound layer 13 serves a dual function. First, the conductive layer 15 serves to magnetically insulate the square wave shaped layer of magnetic material 12 from the straight layer of magnetic material 17 at alternate crossing points of the two layers. This forms each complete square wave cycle of the square wave shaped layer 12 into a figure-eight memory core which may be energized to one magnetic state by directing an electron beam against the conductive layer 11 through a loop comprised of a lower portion of a downwardly extending leg of the square wave shaped layer 12, the lower crossing leg connected thereto, the lower portion of the upwardly extending leg of the layer 12 extending from the crossing leg and the lefthand portion of the associated segment of the straight layer 17. A core may be energized of the opposite state by directing an electron beam against the conductive layer 11 through the loop comprised of the upper portion of an upwardly extending leg of the square wave shaped layer 12 which formed part of the first loop, the upper crossing leg connected thereto, the upper portion of the downwardly extending leg of the layer 12 extending from the upper crossing leg and the remainder of the associated segment of the straight layer 17.

The layer 15 also serves as a sense lead for the core because, since the layer 15 is a conductive layer which extends through the core, it picks up for external detection any current pulses generated by a change of state of the core. Since the sense lead is thus formed as an integral part of the manufacture of the core and since no energizing leads are needed due to the electron beam energization of the core, no wiring whatsoever is required in the manufacture of the memory core structure shown in FIG. 1.

The memory core structure shown in FIG. 1 may be operated more easily if a target is provided for each of the core loops. Each of the targets is formed from a conductive material and extends from a conductive layer 11 through one of the energization loops of the various cores of the structure shown. The targets overlie the magnetic portions of the core structure thereby enlarging the area which must be engaged by an electron beam in order to cause the core to assume a desired magnetic state.

It should be understood that many changes in the configuration of the various elements of the core structure shown in FIG. 1 may be made without departing from the teaching of the invention. In particular, the conductive layer 15 need not be oriented in a particular configuration but may be caused to cross the magnetic layers in any desired direction in order to minimize manufacturing costs and to maximize the operational efficiency of the core structure.

What is claimed is:

1. A magnetic memory core device including:
a first length of high retentivity magnetic material having two ends;
a second length of high retentivity magnetic material having two ends positioned over the first length and extending at an angle with respect thereto,
means for magnetically connecting one end of the first length to one end of the second length thereby forming one loop of an eight-shaped memory core,
means for magnetically connecting the other end of the first length to the other end of the second length thereby forming the other loop of the eight-shaped memory core, and means for alternately directing a current through the two loops in the same direction thereby causing the memory core to change from one magnetic state to the other.

2. The memory core device according to claim 1 further including:
a length of conductive, nonmagnetic material positioned between the two lengths of magnetic material for magnetically insulating the lengths from each other and for conducting currents generated by changes of the magnetic state of the memory core.

3. The memory core device according to claim 1 wherein the means for alternately directing a current through the two loops in the same direction includes a sheet of conductive material positioned adjacent the memory core and means for directing an electron beam through the loops into engagement with the conductive sheet.

4. The memory core according to claim 3 further including means for supporting the first and second lengths of magnetic material and the length of conductive material on the sheet and means for electrically insulating the length of conductive material from the sheet.

5. A magnetic memory core unit comprising:
a support;
a first length of magnetic material mounted on the support;
a body of magnetically insulative material mounted on the support and extending over a portion of the first length of magnetic material;
a second length of magnetic material mounted on the support and extending over the body of magnetically insulated material and the first length of magnetic material at the point whereat the body of magnetically insulative material extends over the first length of magnetic material, and
means for magnetically interconnecting the first and the second lengths of magnetic material at two points one on each side of the point where the second length passes over the first length thereby forming a figure 8 memory core.

6. The memory core according to claim 5 further including means for alternately directing a current in the same direction through each of a pair of points one positioned between the two lengths of magnetic material and between one of the points of interconnection of the two lengths and the point where the lengths cross and the other located between the two lengths of magnetic material and between the other point of interconnection of the two lengths and the point where the lengths cross thereby causing the memory core to assume one of the other of two magnetic states.

7. The magnetic core unit according to claim 5 wherein the body of magnetically insulative material is formed from electrically conductive material and thereby serves to collect currents generated by changes in the magnetic state of the core.

8. A memory core unit comprising:
a square wave shaped length of magnetic material;
a length of conductive, non-magnetic material covering at least part of the center leg of the square wave shaped length of magnetic material, and
a length of magnetic material extending between the outside two of the square wave shaped length of magnetic material and magnetically connected thereto and passing over the center leg at the point whereat the center leg is covered by the length of conductive material thereby forming an eight-shaped memory core unit the crossing legs of which are magnetically insulated from each other.

9. The core unit according to claim 8 wherein the two lengths of magnetic material and the length of conductive material are all supported on a conductive sheet and further including means for directing an electron beam alternately through each loop of the eight-shaped memory core thereby causing the core to change its magnetic state.

10. The memory core according to claim 8 wherein the square wave pattern of the square wave shaped length of material is repeated through at least two square wave cycles, wherein the length of conductive material crosses alternate legs of the square wave pattern of the square wave shaped length of magnetic material and wherein the other length of magnetic material extends in a straight line along the longitudinal center of the square wave pattern and is coupled magnetically to each leg of the square wave shaped length of magnetic material except those crossed by the length of conductive material.

References Cited

UNITED STATES PATENTS 3,292,161 12/1966 Broadbent ---------- 340—174

BERNARD KONICK, Primary Examiner

S. B. POKOTILOW, Assistant Examiner

PO-1050
(5/69)

UNITED STATES PATENT OFFICE
CERTIFICATE OF CORRECTION

Patent No. 3,521,256 Dated July 21, 1970

Inventor(s) JACK L. METZ

It is certified that error appears in the above-identified patent and that said Letters Patent are hereby corrected as shown below:

Claim 8

Column 4, line 63, after "two" insert --legs--

Signed and sealed this 23rd day of March 1971.

(SEAL)
Attest:

EDWARD M.FLETCHER,JR.
Attesting Officer

WILLIAM E. SCHUYLER, JR.
Commissioner of Patents